(12) United States Patent
Garuti et al.

(10) Patent No.: US 12,040,700 B2
(45) Date of Patent: Jul. 16, 2024

(54) POWER SUPPLY APPARATUS

(71) Applicant: MKS Instruments, Inc., Andover, MA (US)

(72) Inventors: Marco Garuti, Andover, MA (US); Francesco Braghiroli, Andover, MA (US); Paolo Balocchi, Andover, MA (US); Mario Massa, Andover, MA (US)

(73) Assignee: MKS INSTRUMENTS, INC., Andover, MA (US)

( * ) Notice: Subject to any disclaimer, the term of this patent is extended or adjusted under 35 U.S.C. 154(b) by 86 days.

(21) Appl. No.: 17/973,267

(22) Filed: Oct. 25, 2022

(65) Prior Publication Data

US 2023/0129542 A1 Apr. 27, 2023

Related U.S. Application Data (60) Provisional application No. 63/272,535, filed on Oct. 27, 2021.

(51) Int. Cl.
*H02M 1/42* (2007.01)
*G05F 1/70* (2006.01)
*H02M 7/48* (2007.01)

(52) U.S. Cl.
CPC ............ *H02M 1/4266* (2013.01); *G05F 1/70* (2013.01); *H02M 1/4216* (2013.01);
(Continued)

(58) Field of Classification Search
CPC .. H02M 1/007; H02M 7/4807; H02M 7/4826; H02M 7/493; G05F 1/70
See application file for complete search history.

(56) References Cited

U.S. PATENT DOCUMENTS 6,028,777 A * 2/2000 Nguyen ................. H02M 7/48
363/37
9,954,462 B2 * 4/2018 Chapman ............ H02M 7/4807
(Continued)

FOREIGN PATENT DOCUMENTS

| JP | 1998304663 A | 11/1998 |
|----|--------------|---------|
| JP | 2016082792 A | 5/2016 |
| JP | 2017163657 A | 9/2017 |

OTHER PUBLICATIONS

Search Report issued for PCT counterpart application No. PCT/US2022/047737 dated Feb. 20, 2023 (3 pages).
(Continued)

*Primary Examiner* — Gary A Nash (57) ABSTRACT

A power supply apparatus, comprising at least one circuit board having thereon at least a first single phase power factor controlled (PFC) circuit, and a second PFC corrected circuit, the first single phase PFC circuit and the second PFC corrected circuit each having at least one PFC device in communication with at least one inverter, at least one resonant (LC) circuit positioned on the at least one circuit board and in electrical communication with at least one of the first single phase PFC circuit and the second PFC corrected circuit, at least one transformer in communication with at least one of the first single phase PFC circuit and the second PFC corrected circuit via the at least one LC resonant circuit, the at least one transformer configured to generate at least one transformer output signal, and at least one capacitor in communication with the at least one transformer and configured to output at least one magnetron input signal in response to the at least one transformer output signal, and at least one power supply generating at least one three phase input voltage, the at least one circuit board in communication with the at least one power supply.

10 Claims, 6 Drawing Sheets

(52) U.S. Cl.
CPC ......... *H02M 1/4241* (2013.01); *H02M 1/425* (2013.01); *H02M 7/4807* (2013.01); *H02M 7/4826* (2013.01)

(56) References Cited

U.S. PATENT DOCUMENTS

| | | | |
|---|---|---|---|
| 10,644,503 B2* | 5/2020 | Perreault | H02M 7/68 |
| 2002/0073922 A1 | 6/2002 | Frankel et al. | |
| 2004/0050842 A1 | 3/2004 | Han et al. | |
| 2010/0155393 A1* | 6/2010 | Suenaga | H05B 6/685 |
| | | | 219/702 |
| 2011/0305049 A1* | 12/2011 | Raptis | H02M 7/4807 |
| | | | 323/215 |
| 2015/0365003 A1* | 12/2015 | Sadwick | H02M 3/28 |
| | | | 363/21.01 |

OTHER PUBLICATIONS

Written Opinion issued for PCT counterpart application No. PCT/US2022/047737 dated Feb. 20, 2023 (4 pages).

* cited by examiner

POWER SUPPLY APPARATUS

CROSS-REFERENCE TO RELATED APPLICATIONS

This patent application claims the benefit of U.S. Prov. Ser. No. 63/272,535 filed on Oct. 27, 2021, application that is incorporated by reference herein.

BACKGROUND OF THE INVENTION

Field of the Invention

This invention relates to a power supply apparatus. More specifically, this invention pertains to a multi-phase power supply apparatus with power factor correction for use with magnetrons.

Description of Related Art

Magnetrons are presently used in numerous applications in which microwave radiation is used. In industrial settings, magnetrons are often used to generate plasmas useful in any number of material processing applications, such as chemical vapor deposition processes (hereinafter CVD) used in the manufacture of semiconductor devices, and the like. For example, magnetrons may be used to provide microwave radiation with sufficient excitation energy to ignite and sustain a plasma within a plasma chamber during the CVD process. Typically, many of these industrial applications are complex and time consuming. For example, some CVD processing applications require magnetrons to run continuously over long-time durations (a minimum of several days) with very little variation in system performance.

Presently, numerous power supplies for magnetrons are available. Generally, as robustness and stability over time are key considerations when using magnetrons, these typically are uninterruptable power supplies (UPS) whose size, proportions, and operational requirements are considerably greater than required by the processing operation and/or the magnetron. As such, known power supplies for magnetrons tend to be larger than needed, and require complex feedback circuitry to monitor their performance. In addition, these often require complicated management systems and/or thermal management systems.

Thus, at least in light of the foregoing, there is an ongoing need for a simple and compact power supply, for use with magnetrons, capable of offering high stability and reliability.

BRIEF SUMMARY OF THE INVENTION

The present invention has been conceived and developed aiming to provide solutions to the above stated objective technical needs, as it will be evidenced in the following description.

In accordance with an embodiment of the present invention is proposed a power supply apparatus, comprising at least one circuit board, and at least one power supply generating at least one three phase input voltage. The at least one circuit board has thereon at least a first single phase power factor controlled (PFC) circuit and a second PFC corrected circuit. The first single phase PFC circuit and the second PFC corrected circuit each having at least one PFC device in communication with at least one inverter. The circuit board has thereon as well at least one resonant (LC) circuit positioned on the at least one circuit board and in electrical communication with at least one of the first single phase PFC circuit and the second PFC corrected circuit, and at least one transformer in communication with at least one of the first single phase PFC circuit and the second PFC corrected circuit via the at least one LC resonant circuit, the at least one transformer configured to generate at least one transformer output signal. Further, the circuit board has thereon at least one capacitor in communication with the at least one transformer and configured to output at least one magnetron input signal in response to the at least one transformer output signal. The least one power supply generating at least one three phase input voltage is in communication with the at least one circuit board.

In accordance with further aspects of the present invention, the power supply apparatus further comprises at least a third PFC circuit, the third PFC circuit having at least one PFC device in communication with at least one inverter, and in electrical communication with the at least one resonant (LC) circuit. The at least one transformer is in communication with the third PFC circuit at via the at least one LC resonant circuit. The generated at least one three phase input voltage is from about 200 V to about 400 V. The at least one LC circuit is configured to receive at least one output signal from at least one of the first single phase PFC circuit and the second PFC corrected circuit, and to generate at least one LC circuit output signal. The LC circuit comprises either one of a resonant circuit and a quasi-resonant circuit. The at least one transformer comprises one of a single winding transformer, a multiple winding transformer, a step-up transformer or a transformer with a center tap configuration. The power supply apparatus is configured to work with either a single-phase input voltage or a multi-phase input voltage. The at least one power supply comprises a multi-phase power supply capable of operating with a plurality of input voltages. The power supply apparatus in accordance with an aspect of the present invention is intended for use with high voltage magnetrons.

More detailed explanations regarding these and other aspects and advantages of the invention are provided herewith in connection with the exemplary embodiments of the present invention.

BRIEF DESCRIPTION OF THE SEVERAL VIEWS OF THE DRAWING(S)

The above and other aspects, features and advantages of the present invention will become more apparent from the subsequent description thereof, presented in conjunction with the following drawings, wherein.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Reference will now be made to the drawings wherein like numerals refer to like parts throughout.

Figure 1:
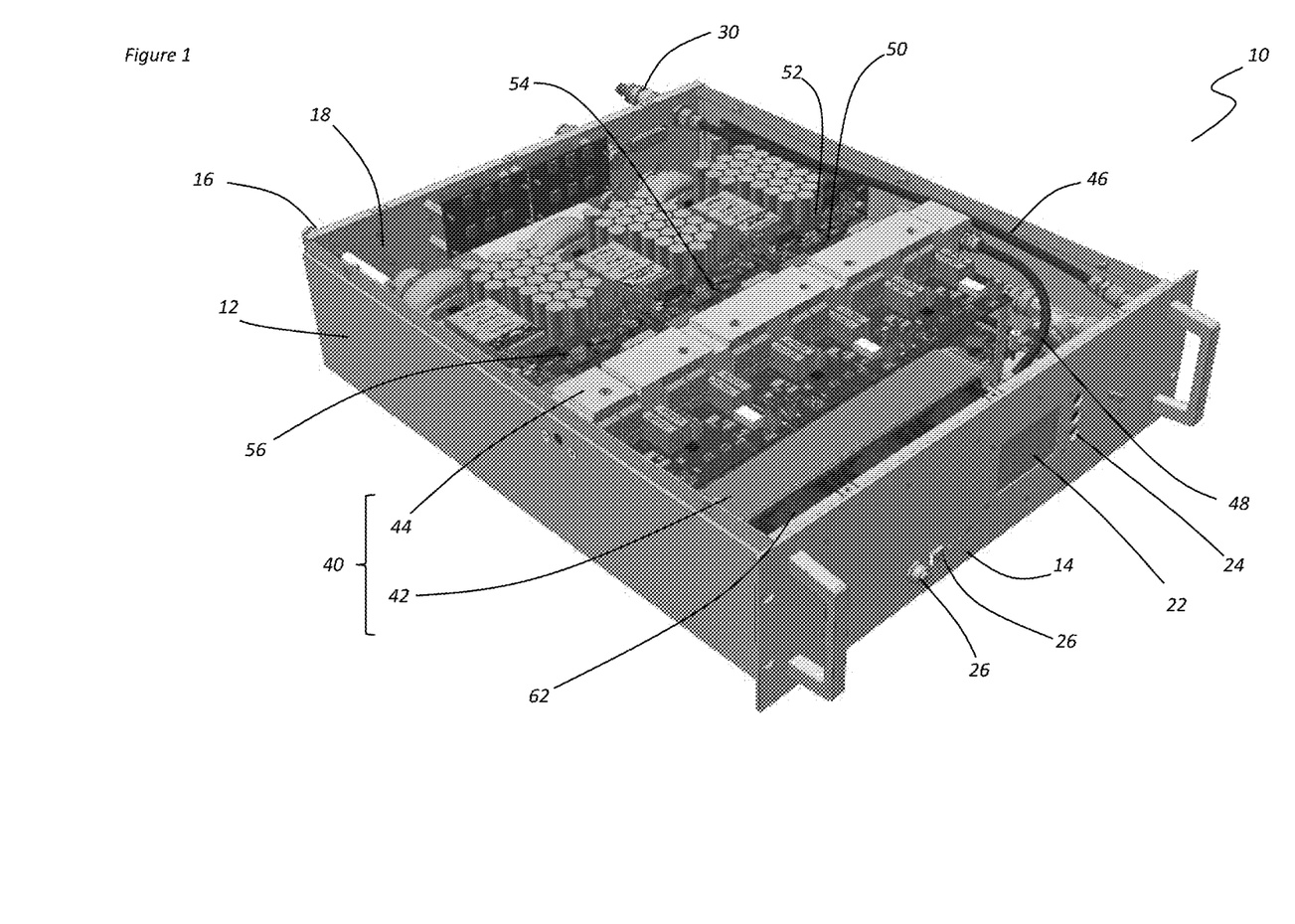
FIG. 1 is a perspective view of a power supply apparatus in accordance with one embodiment of the present invention.
Figure 2:
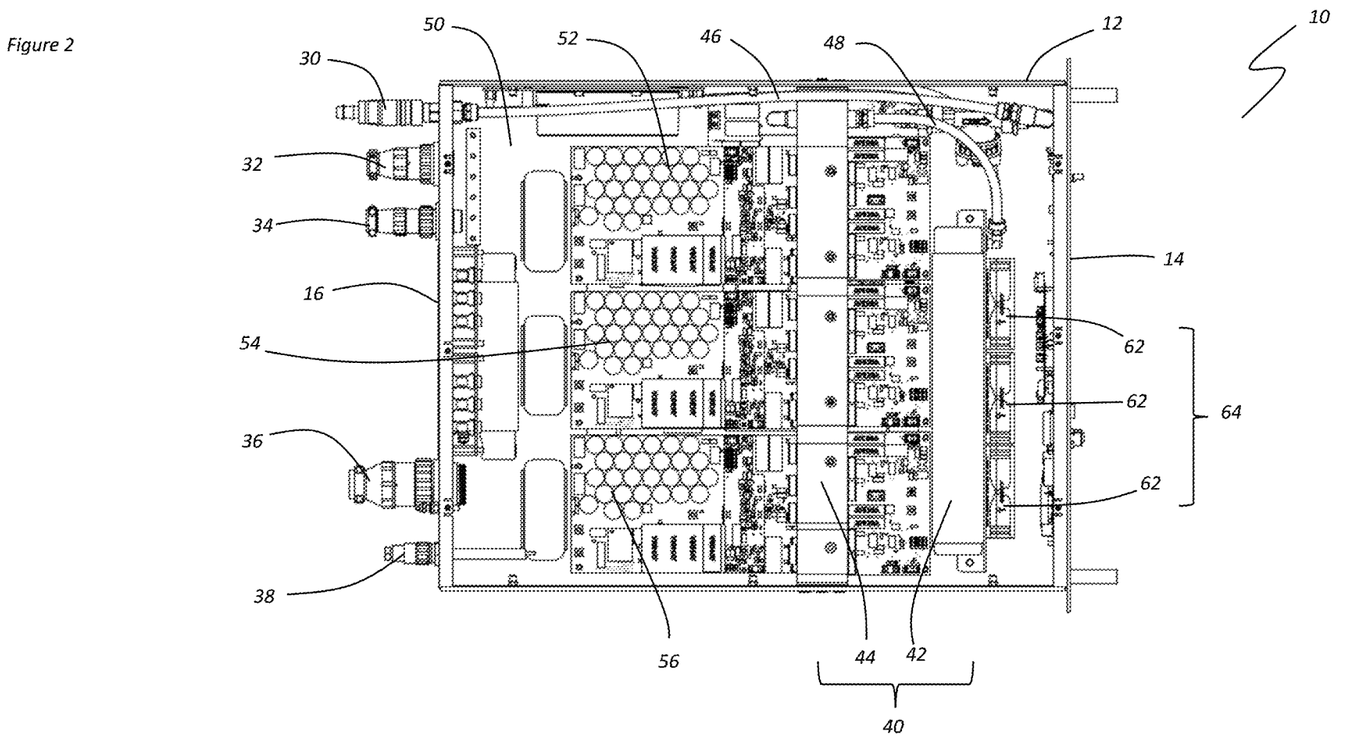
FIG. 2 is a top view of a power supply apparatus in accordance with one embodiment of the present invention.

FIGS. 1 and 2 show a perspective and a top view, respectively, of a power supply apparatus in accordance with one embodiment of the present invention. Specifically, in one embodiment of the present invention, the illustrated power supply apparatus is a multi-phase power supply, with power factor correction, for use with magnetrons. As shown, the power supply apparatus 10 includes a power supply body 12 having at least one faceplate 14 and at least one rear-plate or back-plate 16. As shown, the power supply body 12, the faceplate 14, and the rear-plate 16 cooperatively define one or more power supply recesses 18, sized to receive therein one or more component devices. Further, at least one display device 22 may be positioned on the power supply apparatus 10. In the illustrated embodiment, the display device 22 is positioned on the faceplate 14. Optionally, the power supply apparatus 10 need not include display device(s) 22.

The power supply apparatus 10 may also include one or more actuators and/or connectors thereon. In the illustrated embodiment, at least one actuator 24 is positioned on the faceplate 14. Similarly, one or more connectors 26 may be positioned on the faceplate 14. Any number of additional connectors and/or actuators may be positioned anywhere on the power supply apparatus 10. In one embodiment, the various connectors are positioned on or proximate to the backplate 16 of the power supply apparatus 10. These facilitate that the power supply apparatus 10 may be coupled to or otherwise in communication with various networks, devices, or subsystems exterior to the power supply apparatus 10, via a conduit or wirelessly. For example, as shown, the backplate 16 of the power supply apparatus 10 may include one or more coolant inlet/outlet connectors 30, one or more signal connectors 32, one or more coupling connectors 34, one or more main line connectors 36, and one or more power input connectors 38, thereon. Those skilled in the art will appreciate that any number of connectors may be positioned anywhere on the power supply apparatus 10, in a configuration distinct from the one illustrated in FIGS. 1 and 2. As such, the power supply apparatus 10 may be configured to be coupled to or otherwise in communication with at least one power supply, or a computer network, or other processing system, the last two external of the power supply apparatus 10.

In one embodiment, the power supply apparatus 10 includes therein at least one thermal management system 40. As shown in FIGS. 1 and 2, the at least one coolant inlet/outlet connector 30 may be coupled to one or more coolant supply conduits 46 positioned within a recess 18 of the power supply apparatus 10 to connect with to one or more coolant supply systems external to the power supply apparatus 10, The conduits 46 are configured to deliver coolant from one or more coolant sources (not shown) to the thermal management system 40 of the power supply apparatus 10. In the illustrated embodiment, thermal management system 40 includes a first thermal control body 42 and a second thermal control body 44, although those skilled in the art will appreciate that any number of thermal control bodies may be positioned within the power supply body 12. In accordance with one possible embodiment of the present invention, the first thermal control body 42 comprises a liquid heat exchanger configured to permit liquid cooling of some components within the power supply body 12, while also permitting air cooling other components (for example, SiC diode or other components, if present). The thermal management system 40 may also include one or more fans 62 therein. One or more coolant transport conduits 48 may be used to fluidly couple the first thermal control body 42 to the second thermal control body 44. As such, the thermal management system 40 may include multiple thermal control bodies positioned anywhere within the power supply body 12. Optionally, the thermal management system 40 may also include one or more additional systems or devices including, without limitations, chillers, thermal electric coolers, cold plates, and the like. Although not shown, it should be understood by one of ordinary skill in the art that one or more coolant extraction conduits (not shown) may also be positioned within the power supply body 12, and used for extracting coolant from the power supply apparatus 10 via the at least one coolant outlet connector 30. Unlike in the systems already available in the art, the thermal management system 40 of the power supply apparatus 10 may not require the circulation of external air within the power supply body 12. As such, the power supply body 12 may be a sealed unit.

As shown in FIGS. 1 and 2, at least one circuit board 50 may also be positioned within a recess 18 formed within the power supply body 12, proximate to at least one of the first thermal control body 42 and second thermal control body 44 of the thermal management system 40. As such, the thermal management system 40 may be configured to selectively adjust the temperature of the various components and devices positioned on or in communication with the circuit board 50. The circuit board 50 may have thereon one or more power factor controlled (PFC) circuits. In the illustrated embodiment, the circuit board 50 includes a first PFC circuit 52, a second PFC circuit 54, and a third PFC circuit 56. Those skilled in the art will appreciate that any number of PFC circuits may be formed the circuit board 50. Optionally, the board 50 may include any number of non-PFC circuits therein, or positioned thereon. Said first PFC circuit may be a single-phase power factor controlled circuit 52 and said second PFC circuit may be a PFC corrected circuit.

Figure 3:
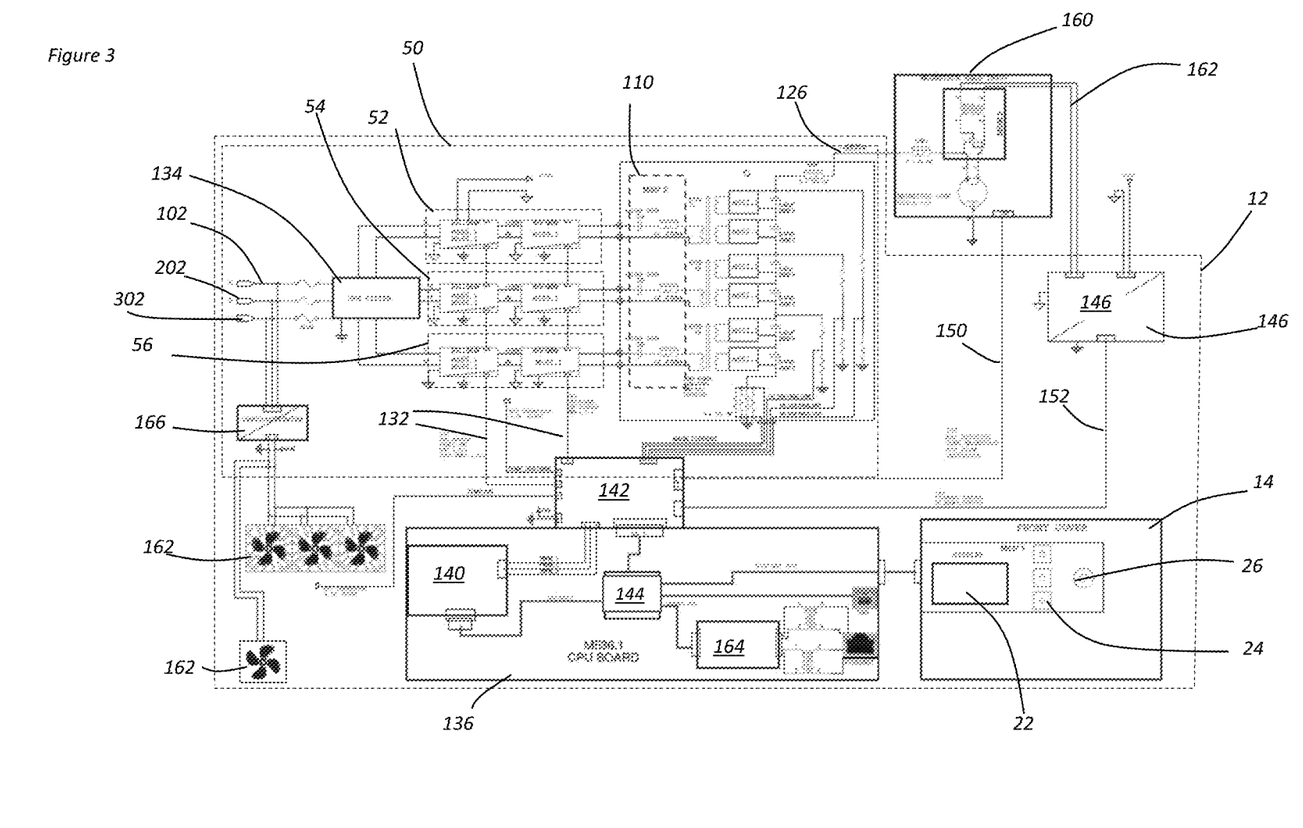
FIG. 3 is a schematic diagram of a multi-phase power supply, in accordance with the present invention.
Figure 4:
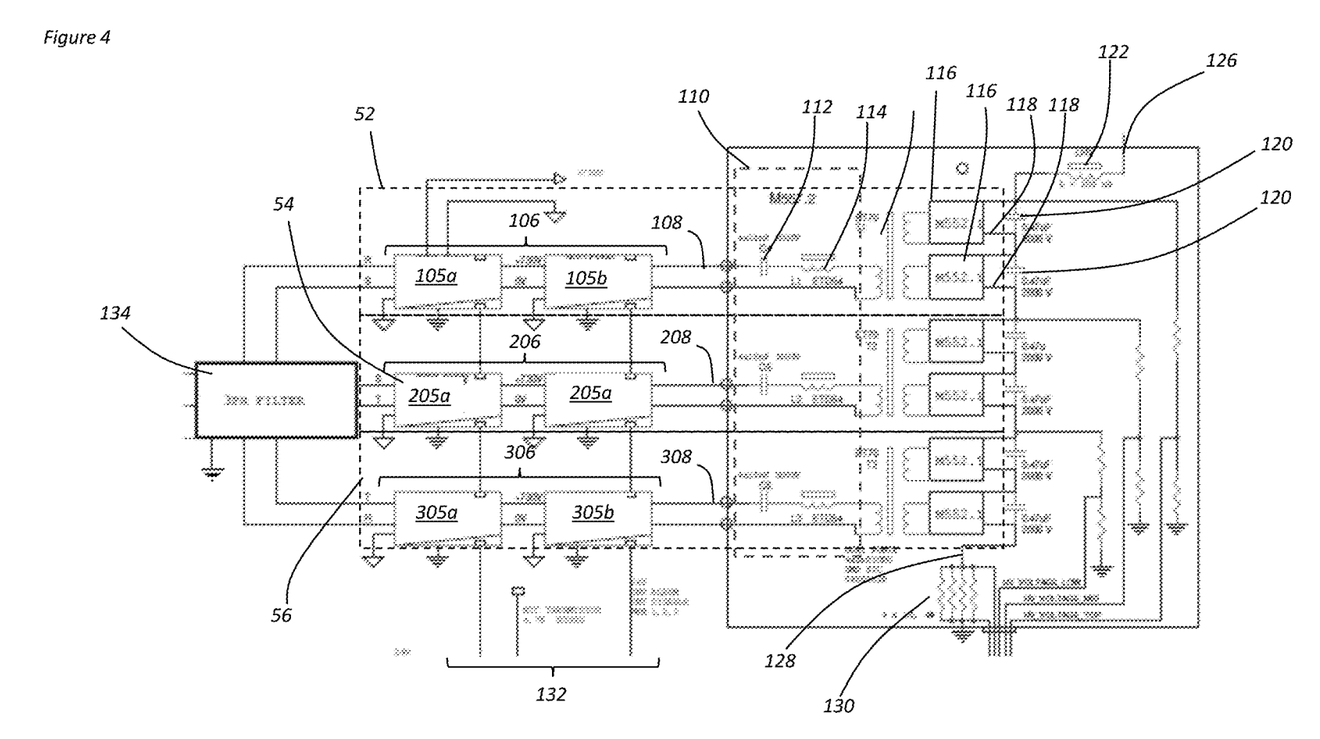
FIG. 4 is another schematic diagram of a multi-phase power supply, in accordance with the present invention.

FIGS. 3 and 4 show various schematic diagrams of an embodiment of a multi-phase power supply apparatus 10, including one or more PFC circuits 52, 54, 56 therein. As shown, an input signal, such as voltage and/or power, may be supplied to the circuit board 50 via inputs 102, 202, 302. Any number of power inputs may be used with the power supply apparatus 10. In one embodiment, at least one of the voltage inputs 102, 202, 302 may be in communication with at least one of signal connector 32, coupling connector 34, main line connector 36, and power input connector 38 positioned on the power supply body 12. The at least one power supply generating the input signal, that might exemplarily be a three-phase input voltage, is in communication via the inputs 102, 202, 302 with the circuit board 50.

The circuit board 50 may also include at least one filter device 134 configured to filter noise, transient voltages and/or currents, or otherwise condition the signals received from inputs 102, 202, 302. In an alternative embodiment, the circuit board 50 need not include a filter device 134. In one embodiment, a voltage of the signal received from inputs 102, 202, 302 ranges from about 110 V to 400 V, or more. For example, in one embodiment, at least one of the signals received from inputs 102, 202, 302 comprises three-phase voltage, that ranges from about 200 V to about 400 V.

As shown in FIGS. 3 and 4, in the illustrated embodiment, the first PFC circuit 52 includes at least one PFC inverter system 106 therein. In the illustrated embodiment, the first PFC inverter system 106 includes at least one PFC device 105*a* and at least one inverter 105*b*. The power supply apparatus 10 may include any number of PFC circuits therein. In the illustrated embodiment, a second PFC inverter system 206 and at least a third PFC inverter system 306 is positioned on or otherwise in communication with the circuit board 50 of the power supply apparatus 10. Like the first PFC inverter system 106, the second PFC inverter system 206 may include at least one PFC device 205*a* and at least one inverter 205*b* therein. Similarly, the third PFC inverter system 306 may include at least one PFC device 305*a* and at least one inverter 305*b* therein. Optionally, the PFC device 105*a*, 205*a*, and 305*a* may comprise three independent single-phase PFC devices. Said single-phase circuits may be of boost type. Those skilled in the art will appreciate that the any variety of devices may be used as a PFC device in the present system. Similarly, any variety of devices may be used to form the inverters 105*b*, 205*b*, and 305*b* including, without limitation, insulated-gate bipolar transistors (IGBT) and the like. For example, in one embodiment at least one inductor 105*b*, 205*b*, 305*b* comprises an IGBT inverter, although those skilled in the art will appreciate that any variety of inverters may be used and configured to run at any desired run times. In the illustrated embodiment, the PFC inverter system 106, 206, 306 are formed by individual PFC devices 105*a*, 205*a*, 305*a*, and inverters 105*b*, 205*b*, 305*b*, although those skilled in the art will appreciate that each PFC inverter system 106, 206, 306, respectively may be formed from a single device having a PFC devices 105*a*, 205*a*, 305*a*, respectively, and inverters 105*b*, 205*b*, 305*b*, respectively, therein. In the illustrated embodiment, each inverter 105*b*, 205*b*, 305*b* is configured to output at least one inverter output signal 108, 208, 308. In one embodiment, at least one PFC inverter system 106, 206, 306 may be configured to receive at least one input signal from inputs 102, 202, 302 which comprises an alternating current (AC) signal, and to output at least one direct current (DC) signal. In another embodiment, at least one of the input signals from inputs 102, 202, 302 or inverter output signals 108, 208, 308 comprises a two (2) phase signal, although those skilled in the art will appreciate that any number of phases may be used. For example, at least one inverter output signal 108, 208, 308 may comprise a pulsed DC output signal at any variety of pulse frequencies, voltages, currents, pulse durations, and the like. Optionally, at least one inverter output signal 108, 208, 308 may comprise an AC output signal.

Referring again to FIGS. 3 and 4, each PFC circuit 52, 54, 56 includes at least one LC circuit 110 in communication therewith. In one embodiment, the LC circuit comprises a resonant circuit, although those skilled in the art will appreciate that at least a portion of the LC circuit 110 need not be resonant. In the illustrated embodiment, the inverter output signal 108 emitted from the inverter 105*b* is directed into a portion of the LC circuit 110 which includes at least one capacitor 112 and at least one inductor 114 in communication with the capacitor 112. In the illustrated embodiment, the inductor 114 is coupled to the capacitor 112 in series. Optionally, the inductor 114 may be coupled to the capacitor 112 in parallel. Similarly, the inverter output signal 208 emitted from the inverter 205*b* and the inverter output signal 308 emitted from the inverter 305*b* are also directed into the LC circuit 110, and from there also are directed into at least one capacitor 112 and at least one inductor 114. As shown, in one embodiment, the present system provides three single-phase PFC inverter systems 106, 206, 306 in series with three switching resonant or quasi-resonant circuits formed in the LC circuit 110. In one embodiment, the phases of the PFC inverter systems 106, 206, 306 are offset from each other by approximately one hundred and twenty (120) degrees, although those skilled in the art will appreciate that any phase relationship may exist with the PFC inverter systems 106, 206, 306. Further, the capacitors 112 and inductors 114 used in the circuits 52, 54, 56 have the same or similar values and properties, although those skilled in the art will appreciate that the values and properties of the capacitors 112 and inductors 114 used in the circuits 52, 54, 56 need not be the same or similar.

As shown in FIGS. 3 and 4, the output of each inverter 114 located within each individual PFC circuits 52, 54, 56 may be directed into one or more transformers 116. In the illustrated embodiment, each PFC circuit 52, 54, 56 includes a multiple winding transformer 116, although those skilled in the art will appreciate that any variety of transformers 116 may be used. For example, at least one of the transformers 116 may comprise a step-up transformer. In one embodiment, transformers 116 having the same or similar performance characteristics are used in the PFC circuits 52, 54, 56. Optionally, different transformers 116 may be used in the at least one of the PFC circuits 52, 54, 56. For example, the first PFC circuit 52 may include a multiple winding transformer 116 while the second PFC circuit 54 may include a single winding transformer 116. If desired, at least one transformer 116 may include a center tap or similar configuration. The transformer output 118 from at least one of the transformers 116 may be directed into at least one capacitor 120, the output of which forms at least one magnetron input signal 126 used to delivering a stable signal with reduced sinusoidal ripple, as compared with prior art systems and designs. In the illustrated embodiment, multiple capacitors 120 forming a capacitor bank may be used to further mitigate ripple or otherwise condition the magnetron input signal 126. In the illustrated embodiment, at least one inductor 122 may be in communication with the output of at least one capacitor 120 to modify or otherwise condition the magnetron input signal 126. Optionally, at least one of the PFC circuits 52, 54, 56 need not include the inductor 122. In one embodiment, the first PFC circuit 52 is configured to output at least one transformer output signal 118. Similarly, the second PFC circuit 54 is configured to output at least one output signal 118 while the second PFC circuit 54 is configured to output at least one output signal 118. The magnetron input signal 126 is comprised of the output of the serially combined capacitors 122, charged by the outputs 118 of the transformers 116. In one embodiment, the magnetron input signal 126 has a voltage of about four thousand (4000) volts or more. In another embodiment, the magnetron input signal 126 has a voltage of about seven thousand two hundred (7200) volts or more. Optionally, the magnetron input signal 126 has a voltage of about ten thousand (10000) volts or more.

Referring again to FIGS. 3 and 4, at least one resistor bank or power dump 130 may be configured to receive at least one signal 118 from at least one transformer 116 and/or capacitor 120. Various resistors, inductors, capacitors, sensors, temperature sensors, meters and the like may also be used throughout the circuit board 50 of the multi-phase power supply apparatus 10. In addition, any variety of additional devices or components may be coupled to or otherwise in communication with the circuit board 50 of various additional systems coupled to the multi-phase power supply apparatus 10. For example, in the illustrated embodiment, the at least one pulse generator 140 is configured to provide at least one pulse generator signal 132 to at least one of the PFC devices 105*a*, 205*a*, 305*a*, the inverters 105*b*, 205*b*, 305*b*, or both. At least one fault detection device 142 may be included on or in communication with the circuit board 50. In one embodiment, the fault detection device 142 may be coupled to at least one of the pulse generator 140, at least one processor (e.g. CPU), at least one filament power supply 146, and at least one magnetron 160. For example, the CPU 144 may be configured to control and monitor the performance of the magnetron 160 during use via at least one of the fault detection device 142, and at least one magnetron control line 150. Further, the CPU 144 may be configured to control and monitor the performance of the filament power supply 146 via at least one of the fault detection device 142 and at least one filament power supply conduit 152 and the magnetron filament power conduit 162. Further, the CPU 144 may be in communication with at least one of the display 22, actuator 24, connector 26, thermal management system 40, and the fan 62. Optionally, the CPU 144 may be configured to communicate with at least one external processor or network (not shown) via at least one connector 26, or, in the alternative, wirelessly. As such, the multi-phase power supply apparatus 10 disclosed herein may be configured to provide real-time measurement and control of the power delivered by the multi-phase power supply apparatus 10 to at least one magnetron 160 coupled thereon. In addition, at least one additional device, component, or system 166 may be used in the power supply apparatus 10. Exemplary devices include, without limitations, filters, temperature sensors, sensor, and the like. For example, the additional component 166 may comprise a twenty four volt (24 V) power supply configured to supply power to at least one of the logic circuits of the CPU 144, the fans 62, or other systems included in the power supply apparatus 10 requiring additional or specific power.

Figure 5:
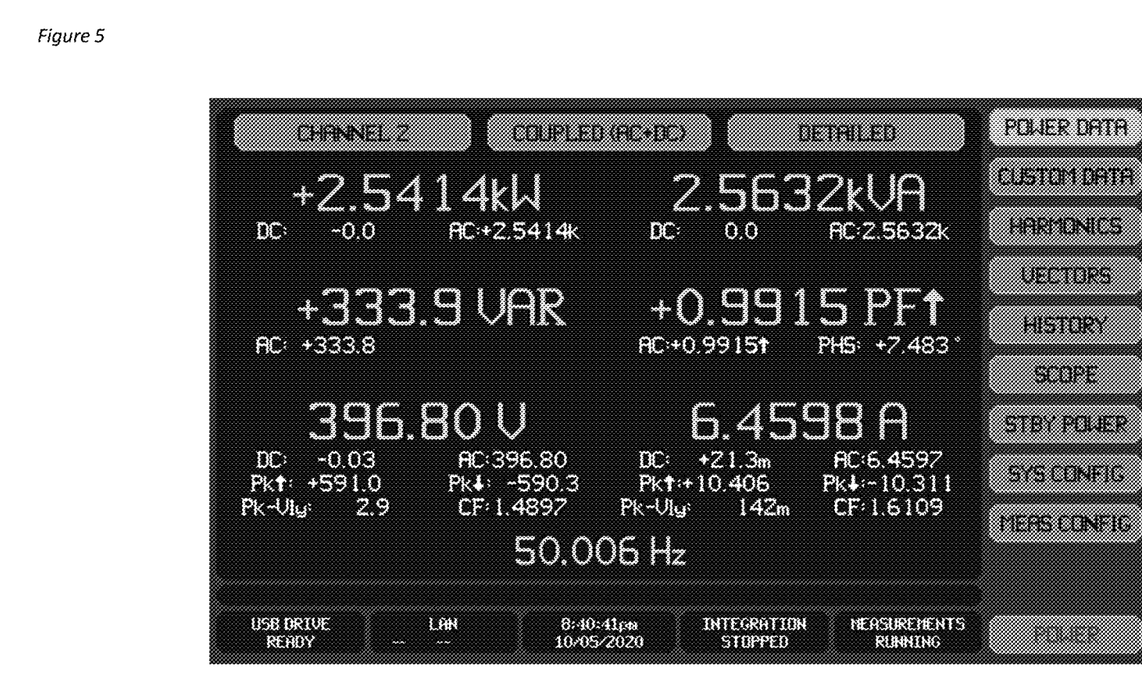
FIG. 5 is illustrates oscilloscope data illustrative of the performance of an embodiment of the multi-phase power supply apparatus operating, at two (2) input voltages.
Figure 6:
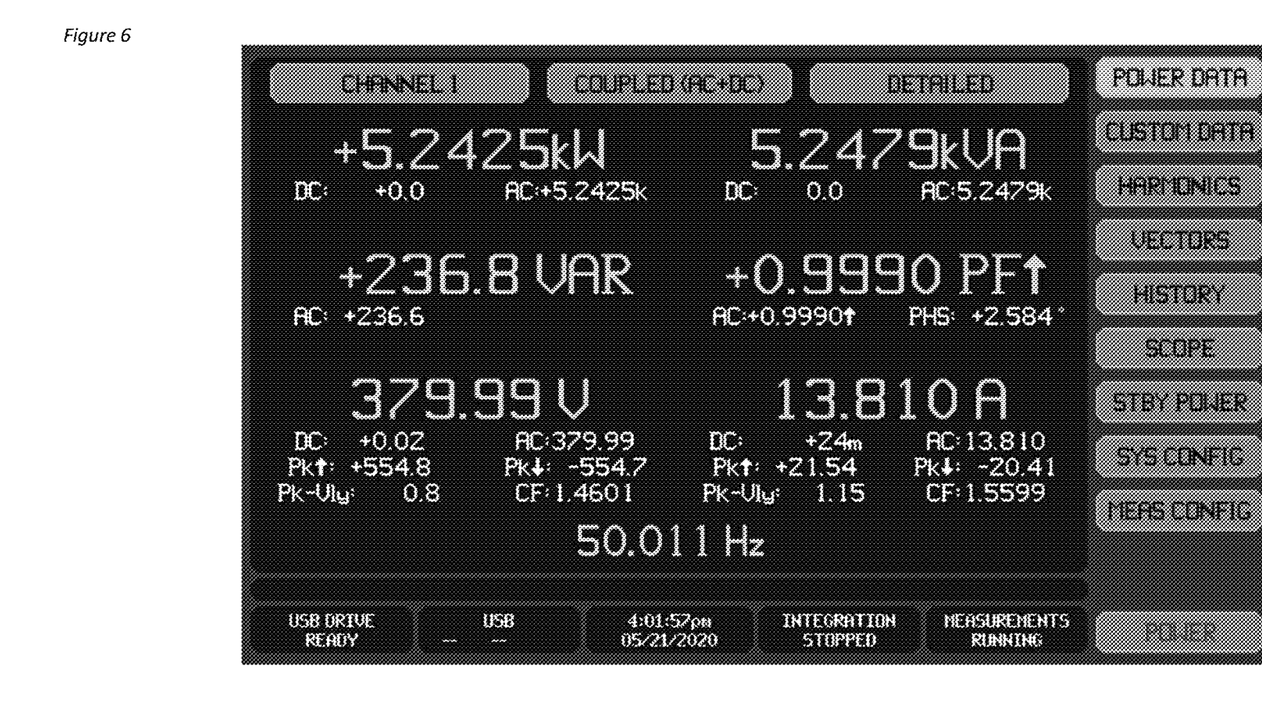
FIG. 6 is another illustration of oscilloscope data, illustrative of the performance of an embodiment of the multi-phase power supply apparatus operating, at two (2) input voltages.

FIGS. 5 and 6 show oscilloscope or similar meter data of the performance of an embodiment of the multi-phase power supply operating at two (2) input voltages. As stated above, the multi-phase power supply apparatus 10 is configured to operate with a wide variety of input voltages. In one embodiment, the power supply is configured to operate with input voltages from about two hundred volts (200V) to about four hundred volts (400V). Further, the multi-phase power supply apparatus 10 may be configured to work with single phase or multi-phase input voltage. For example, in one specific embodiment the power supply apparatus 10 may be configured to operate with three (3) phase voltages. In one embodiment, the power supply apparatus 10 may be configured to provide stable power having reduced ripple as compared with prior art systems for magnetrons operating at any variety of powers. For example, in one embodiment the power supply apparatus 10 may be particularly useful for use with magnetrons operating at three kilowatts (3 kW) or greater. As shown in FIG. 5, the multi-phase power supply apparatus 10 received an input voltage of about 333 V (AC) and generates an output power of about 2.5 kW having a power factor of about 0.9915. In FIG. 6, the multi-phase power supply apparatus 10 received an input voltage of about 236 V (AC) and generated an output power of about 5.24 kW having a power factor of about 0.9990.

As discussed above, the multi-phase power supply apparatus with power factor correction of the present invention is used for delivering stable input power to a magnetron having minimum power ripple, and a power factor approaching one (1). One of the reasons for the almost unity power factor resides in the input circuit providing three classic single-phase PFC circuits of the boost type. The multi-phase power supply of the present invention also complies with the EU norms about the limit of Total Harmonic Distortion (THD) generated on the input grid. Since the power supply of the present invention exhibits minimized power output ripple, the magnetron run will be stabilized, and as such the magnetron will run in ideal conditions. The power supply of the present invention is easily adaptable to the different 3 phase voltage US/JP/EU (200V-400V) requirements, avoiding as such having to have for each of these regions' different constructions and designs for the power supply. The power supply of the present invention is able to reach an electrical efficiency >95%, while not requiring cooling with external air. The power supply of the present invention as a reduced volume and weight, by factor of 2, when compared to other solutions.

While in accordance with an embodiment of the present invention, the presently proposed power supply consists of three single-phase PFC circuits, placed with in series three switching quasi-resonant power supplies, and as such exhibits a great number of components, these components have an acceptably low cost, while the overall performance of the resulting equipment is better than any other configuration. Specifically, the power factor is practically equal to 1 and the current ripple on the magnetron, both at low and high frequency, is negligible, almost difficult to catch, and does not require complex or fast feedback circuitry. In fact, the system can also operate in open loop control, without feedback from the load side.

As discussed above, the power supply of the present invention exhibits an almost absent ripple at low and high frequency. This is due partially to the fact that each PFC circuit, is charging the capacitors (that may be disposed in a bank) with a continuous stabilized voltage, slightly higher than the maximum peak voltage supplied by the grid (in practice, it is adopted at 400 V). The fact that the voltage is stabilized allows the optimal operation of the subsequent series power supply, irrespective of grid fluctuations. But although the DC voltage is stabilized, it still presents a sinusoidal ripple because the capacitors have a value limited by cost and space considerations. If this voltage ripple, indeed limited, is passed to the magnetron load, the corresponding current ripple, due to the very flat characteristic curve of the magnetron, would be orders of magnitude higher than the maximum acceptable, and high enough to damage the magnetron immediately. The circuit topology used in the series power supply is the quasi resonant type. This type of inverter, contrary to the classic controlled by PWM (Pulse Width Modulation), delivers pulses of energy minimally related to the supply voltage, while the output power adjustment is performed by acting not on the pulse shape (as in the PWM power supplies) but on the pulse frequency. As said, although the energy associated with each pulse is condition a little by the voltage, not taking care of the ripple would have the consequence of a significant current ripple, not acceptable in the most advanced applications. The power delivered to the magnetron, however, is the sum of the energy supplied by the three power supplies, each one powered by a pair of phases of the three-phase supply grid. The power ripple will therefore be the result of the sum of the three ripples. As known, the sum of three sinusoids out of phase by 120° (as they are the voltages of a three-phase network) is a constant value, which means that the three ripples cancel out and the final ripple, and even in the absence of a feedback system, is known to be practically zero.

With regard the high frequency ripple, it is of note that the use of an almost resonant inverter (that offers switching on and off of the power components at zero current) allows to work at high switching frequencies and thus these frequencies are more easily filterable. In addition, since in an exemplary embodiment, three inverters are present in its configuration, a single driving circuit may be used, that generates pulses synchronously and suitably phase-shifted for the three inverters so that, at any power level, they are kept equidistant. In practice this is equivalent, considering the ripple at high frequency, with the use of a single inverter operating at three time the basic frequency. It should be noted that the adoption of a quasi-resonant topology leads to a pulse frequency which is reduced at low power. The final effect is that the ripple (in percentage) increases with decreasing power. In addition, below a certain power value, the unit may enter acoustic field and may emit a (modest) high frequency noise.

The circuitry exhibited by the at least one embodiment of the present invention, with parallel 3 single phase circuits, each one with its own PFC stage, has a clear construction topology. In contrast, solutions known from the art, using common magnetic parts, may have lower count of components but testing and maintenance of these circuits is more difficult. The circuitry exhibited by the at least one embodiment of the present invention has a small footprint, and higher efficiency, while comparatively with the solutions known in the art it has a simpler construction of the whole equipment since the dust-proof concept will eliminate the need to exchange air.

The embodiments disclosed herein are illustrative of the principles of the invention. Other modifications may be employed which are within the scope of the invention. Accordingly, the devices disclosed in the present application are not limited to that precisely as shown and described herein.

Although the foregoing descriptions of certain preferred embodiments of the present invention have shown, described and pointed out some fundamental novel features of the invention, it will be understood that various omissions, substitutions, and changes in the form of the expanded microspheres and its precursors or in the methods of making said precursors and said expanded microspheres as illustrated, as well as the uses thereof, may be made by those skilled in the art, without departing from the scope and spirit of the invention. Consequently, the scope of the present invention should not be limited to the foregoing discussions.

What is claimed:

1. A power supply apparatus, comprising:
    at least one circuit board having thereon at least
        a first single phase power factor controlled (PFC) circuit, and
        a second PFC corrected circuit,
        the first single phase PFC circuit and the second PFC corrected circuit each having at least one PFC device in communication with at least one inverter,
        at least one resonant (LC) circuit positioned on the at least one circuit board and in electrical communication with at least one of the first single phase PFC circuit and the second PFC corrected circuit;
        at least one transformer in communication with at least one of the first single phase PFC circuit and the second PFC corrected circuit via the at least one LC resonant circuit, the at least one transformer configured to generate at least one transformer output signal; and
        at least one capacitor in communication with the at least one transformer and configured to output at least one magnetron input signal in response to the at least one transformer output signal, and
    at least one power supply generating at least one three phase input voltage,
    wherein said at least one circuit board is in communication with the at least one power supply.

2. The power supply apparatus of claim 1, further comprising at least a third PFC circuit,
    the third PFC circuit having at least one PFC device in communication with at least one inverter, and in electrical communication with the at least one resonant (LC) circuit.

3. The power supply apparatus of claim 2, wherein said at least one transformer being in communication with said third PFC circuit via the at least one LC resonant circuit.

4. The power supply apparatus of claim 1, wherein the generated at least one three phase input voltage is from about 200 V to about 400 V.

5. The power supply apparatus of claim 1, wherein the at least one LC circuit being configured to receive at least one output signal from at least one of the first single phase PFC circuit and the second PFC corrected circuit, and to generate at least one LC circuit output signal.

6. The power supply apparatus of claim 1, wherein said LC circuit comprising either one of a resonant circuit and a quasi-resonant circuit.

7. The power supply apparatus of claim 1, wherein said at least one transformer comprising one of a single winding transformer, a multiple winding transformer, a step-up transformer or a transformer with a center tap configuration.

8. The power supply apparatus of claim 1, wherein said power supply apparatus being configured to work with either a single-phase input voltage or a multi-phase input voltage.

9. The power supply apparatus of claim 1, wherein said at least one power supply comprising a multi-phase power supply capable of operating with a plurality of input voltages.

10. The power supply apparatus of claim 1, wherein said power supply apparatus is used with high voltage magnetrons.

* * * * *